June 9, 1925. 1,541,691
A. McD. DUCKHAM
FURNACE FOR HEATING HOLLOW CYLINDERS
Filed April 16, 1923 3 Sheets-Sheet 1
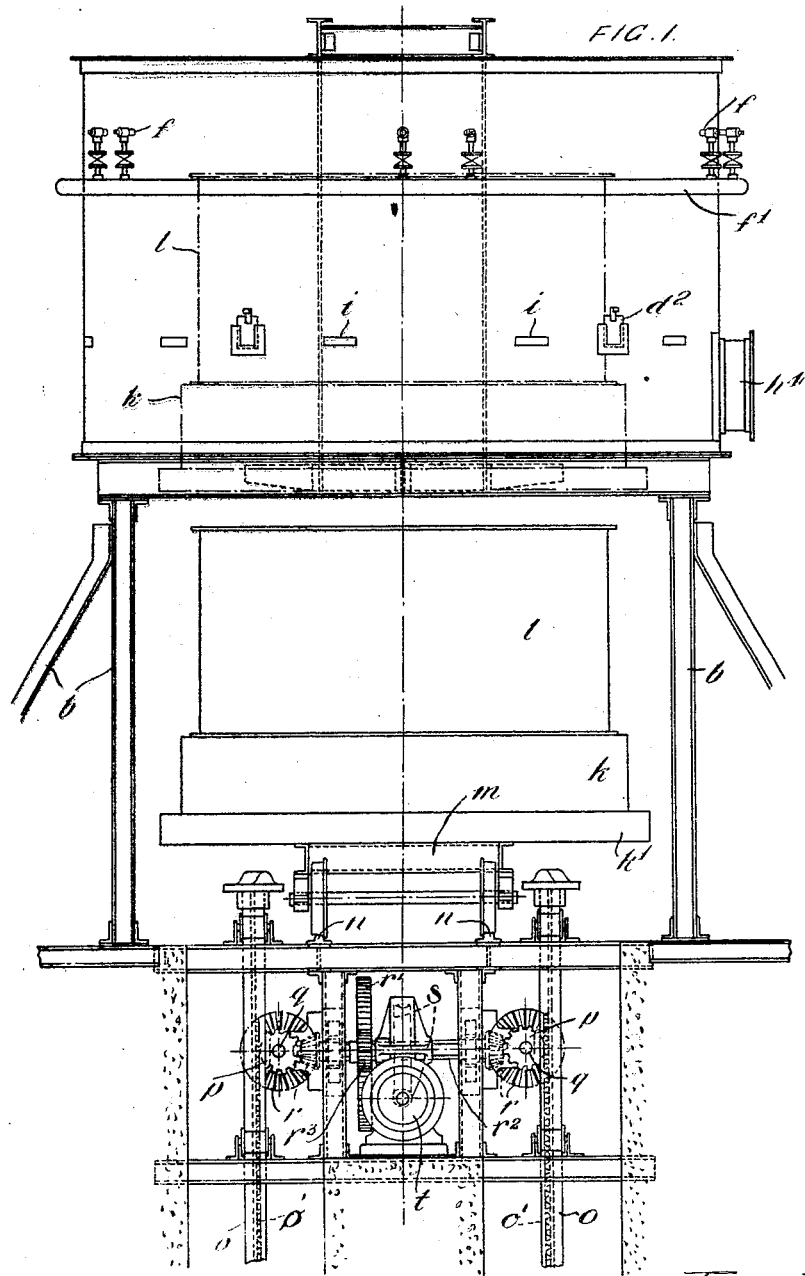
Inventor
Arthur McDougall Duckham
By
Attorney.

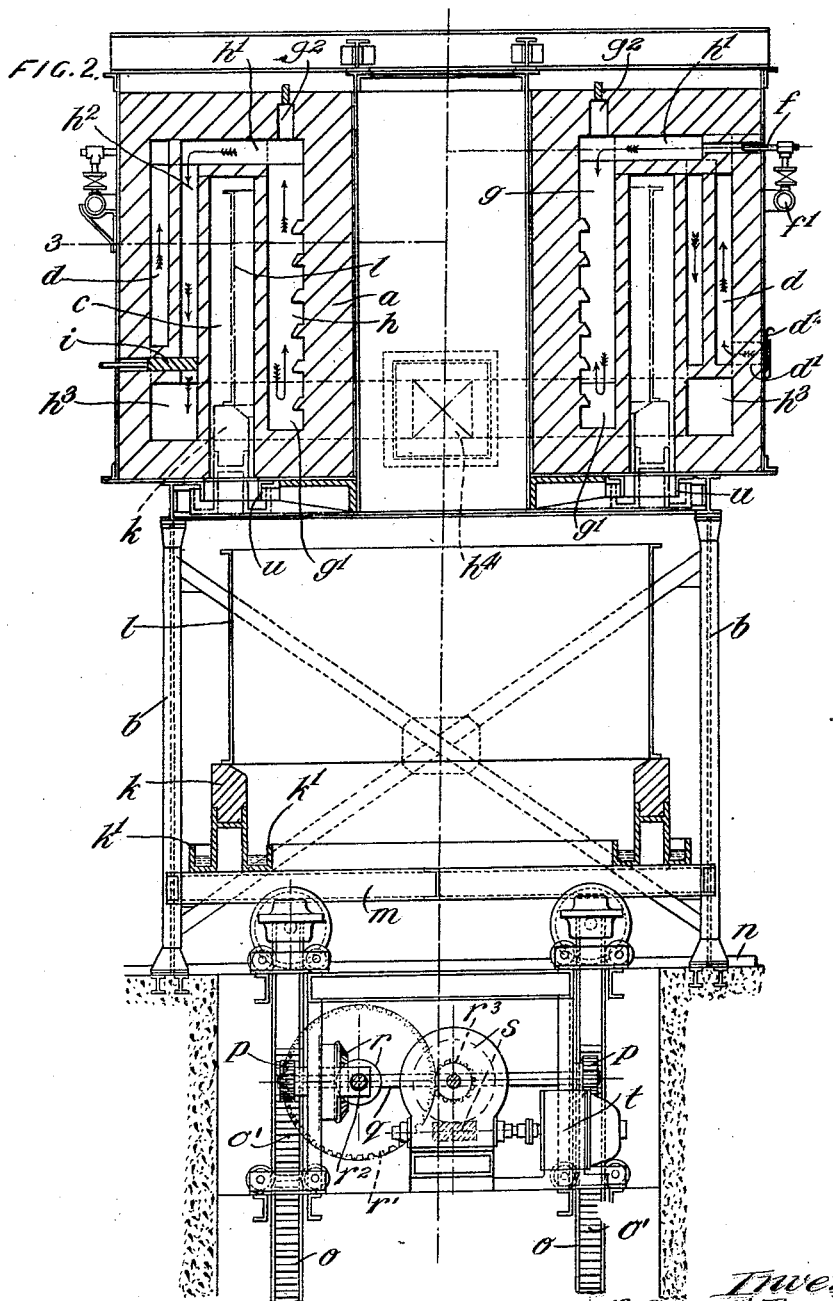

June 9, 1925.
A. McD. DUCKHAM
1,541,691
FURNACE FOR HEATING HOLLOW CYLINDERS
Filed April 16, 1923     3 Sheets-Sheet 3
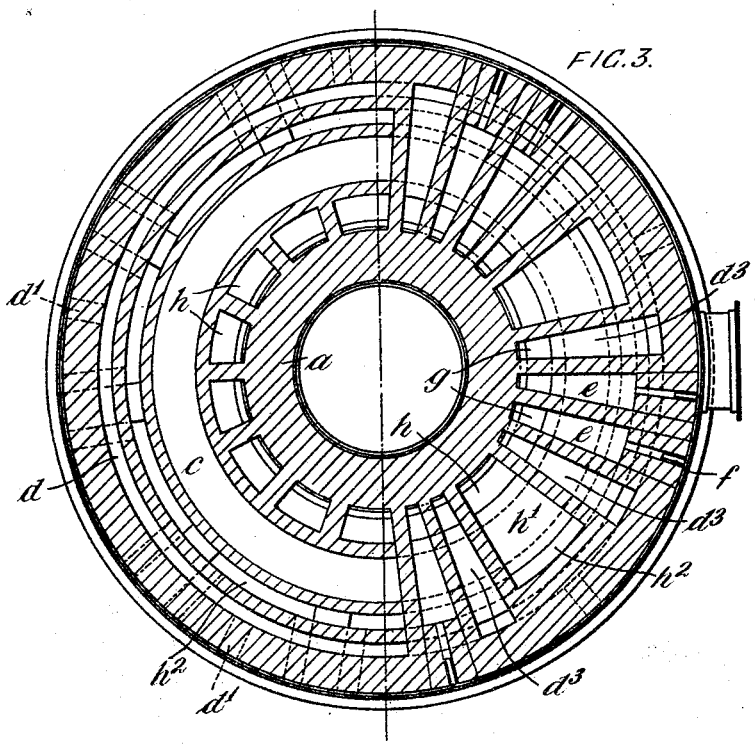
Inventor
Arthur McDougall Duckham
By James L. Norris
Attorney Patented June 9, 1925.

1,541,691

UNITED STATES PATENT OFFICE.

ARTHUR McDOUGALL DUCKHAM, OF LONDON, ENGLAND.

FURNACE FOR HEATING HOLLOW CYLINDERS.

Application filed April 16, 1923. Serial No. 632,475.

*To all whom it may concern:*

Be it known that I, ARTHUR McDOUGALL DUCKHAM, a subject of the King of Great Britain, residing in London, England, have invented certain new and useful Improvements in and Relating to Furnaces for Heating Hollow Cylinders, of which the following is a specification.

The heating of hollow cylinders of considerable diameter whether for their heat-treatment, for enamelling them or for any other purpose, presents difficulties both in respect of handling them and of heating them economically and uniformly.

According to this invention a furnace for heating such cylinders is constructed as an annular muffle furnace, the bottom of which is adapted to be lowered from the furnace to receive the cylinder and to be raised again so as to introduce the cylinder into the annular muffle chamber. An advantage of this form of chamber is that by constructing it of radius suitably selected with reference to the radius of the cylinder to be heated, the latter may be heated equally both internally and externally by the heated walls of the chamber.

The method of introducing objects into a furnace by placing them on a furnace bottom capable of being raised and lowered, is known.

Its application according to this invention to an annular muffle furnace has the particular advantage that it permits the introduction and withdrawal of the cylinder with certainty that it will not come into contact with the walls of the annular chamber, operations difficult to perform if the cylinder is lowered into the chamber.

The annular chamber is preferably surrounded by vertical flues so arranged that combustion occurs on the inner or outer side, or on both sides, of the annulus in flues which alternate with waste gas flues. For example, separate gas and air flues may be constructed radially above the chamber, gas from a producer or the like being admitted at the outer end of each gas flue and air, which has ascended preheating flues contiguous with waste gas flues, being admitted at the outer end of each air flue. Each pair of gas and air flues terminates in a vertical combustion flue on the inside of the annulus. The products of combustion descend these combustion flues and at the bottom pass into waste heat flues, of which there is one between each pair of air and gas flues. The products ascend the waste gas flues and pass through radial flues over the top of the chamber to descend corresponding vertical waste heat flues on the outside of the annulus, thereby serving to heat the aforesaid air preheating flues. The last-named waste heat flues deliver to a common chimney.

The annular chamber is preferably extended somewhat below the brickwork setting by flanges of suitable annular plates so that when the movable bottom constructed as an annular trough, is in place, a sealing medium such as sand or suitable liquid, may close the chamber from access of air if desired.

The bottom is conveniently supported on four rams capable of being raised and lowered hydraulically or otherwise. When the weight to be carried by the bottom is not considerable the rams may be constructed as racks and operated by pinions driven by an electric motor through suitable reducing gear.

The raising and lowering mechanism may be below a railway track on which the chamber bottom carrying the cylinder and mounted on a truck, may be brought into position beneath the annular chamber, whereupon the rams are raised in order to bring the cylinder into the chamber. When the heating is complete the rams are again lowered to rest the bottom on the truck.

In the drawings, Fig. 1 is an elevation of a furnace constructed in accordance with the invention; Fig. 2 is an axial vertical section, and Fig. 3 is a sectional plan on line 3—3 of Fig. 2.

The furnace $a$ is supported on a suitable framework $b$. Its annular muffle chamber $c$ is surrounded by an annular flue $d$ which is in communication with the outside air through radial ports $d'$ controlled by slides $d^2$; at its upper part it is in communication with a number of radial horizontal flues $d^3$ which extend across the top of chamber $c$. Adjacent to each flue $d^3$ is a horizontal flue $e$ which receives fuel gas from a pipe $f$ springing from an annular gas main $f'$. At their inner ends each of the pair of flues $d^3$ and $e$ enters a vertical flue $g$ on the inside wall of the chamber $c$, and this flue is connected by a short horizontal flue $g'$ at its lower part with a like vertical flue $h$. This latter flue enters at its upper part a radial flue $h'$, extending over the top of the chamber $c$ between two flues $d^3$ and terminating at its outer end in a vertical flue $h^2$ between the annular flue $d$ and the outer wall of chamber $c$. All the flues $h^2$ enter at their lower end an annular collecting flue $h^3$ connected with the chimney flue $h^4$ and each is controlled by a damper $i$.

The chimney draught draws air through ports $d'$ into annular flue $d$; here the air is preheated by contact with the walls of flues $h^2$ and passes through flues $d^3$ into flues $g$ where it meets gas issuing from flues $e$. Combustion occurs in flues $g$ and products are drawn by way of flues $g'$, $h$, $h'$ and $h^2$ into the collecting flue $h^3$. The combustion flues receive attention through holes $g^2$.

The ring $k$ constituting the movable bottom of the muffle chamber is represented as carrying a cylinder $l$ to be heated. In Figs. 1 and 2 this ring $k$ is shown in full lines in its lowered position and in dotted lines in the position in which it forms the bottom of the muffle chamber.

The portion of the ring which extends into the heated zone of the chamber $c$ is of firebrick and this is carried by an iron ring having a right-angle flange $k'$ on each periphery to form annular troughs containing sand which receive, in the raised position of the ring, corresponding flanges $u$ depending from the bottom of the furnace; in this manner the chamber $c$ is sealed from air circulation.

The ring is adapted to be carried on a wheeled truck $m$ which can be brought on track rails $n$ from a distance to beneath the furnace. The gear here illustrated for lifting the ring from the truck and holding it in position in the chamber $c$ comprises four suitably guided rams $o$ having rack teeth $o'$ engaged by the four pinions $p$ mounted on the two shafts $q$ which are driven by bevel gears $r$ and toothed wheel $r'$ on a shaft $r^2$ which are driven from a toothed wheel $r^3$ from reducing gear $s$ itself driven by motor $t$.

Having thus described the nature of the said invention and the best means I know of carrying the same into practical effect, I claim:—

1. An annular muffle furnace comprising an annular muffle chamber, a movable bottom to the said chamber and means for lowering the said bottom and for raising it again into its place in the chamber.

2. An annular muffle furnace for heating a hollow cylinder comprising an annular muffle chamber of mean radius equal to the mean radius of the cylinder, a movable bottom to the said chamber, means for lowering the said bottom sufficiently to receive the cylinder and means for raising it again into its place in the chamber.

3. An annular muffle furnace comprising an annular muffle chamber, a movable ring adapted to close the bottom of the chamber, rams on which the said ring rests and means for lowering and raising the said rams.

4. An annular muffle furnace, a framework carrying the furnace, an annular muffle chamber in the furnace, a ring constituting the bottom of the muffle chamber, rams on which the said ring rests, a truck adapted to pass between the rams and to carry the ring and means for operating the rams to lower the ring and to deposit it upon the truck.

In testimony whereof I have signed my name to this specification.

ARTHUR McDOUGALL DUCKHAM.